Feb. 6, 1951     L. B. COURTOT     2,540,656
FASTENING DEVICE
Filed Feb. 24, 1948
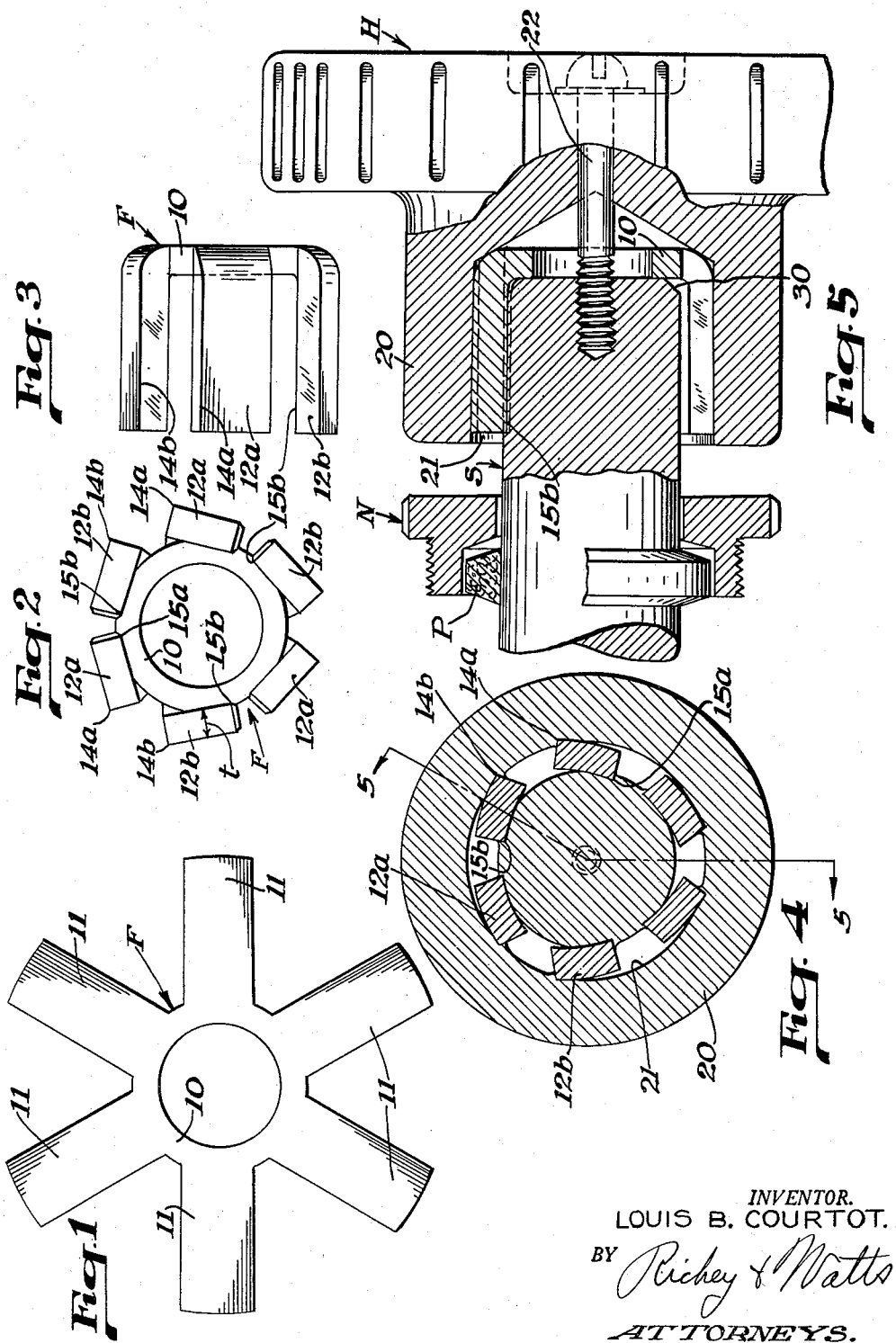
INVENTOR.
LOUIS B. COURTOT.
BY *Richey & Watts*
ATTORNEYS.

Patented Feb. 6, 1951

2,540,656

UNITED STATES PATENT OFFICE 2,540,656

FASTENING DEVICE

Louis B. Courtot, Cleveland, Ohio, assignor to
The Weatherhead Company, Cleveland, Ohio,
a corporation of Ohio Application February 24, 1948, Serial No. 10,227

6 Claims. (Cl. 287—53)

This invention relates to fastening devices and, more particularly, to fastening devices for locking a rod or shaft to a cooperating member to prevent relative rotation between the parts. In the preferred embodiment, I mount a valve handle on a valve stem with my novel fastener.

It is an object of this invention to eliminate the milling of flats on the shaft or valve handle usually employed for preventing relative rotation, and to eliminate the necessity for threading the internal terminal portion of the valve stem, and to eliminate close tolerances required if press fits are employed for the aforesaid purpose.

Briefly, these objects are accomplished by forming a bore in the handle or other part that joins with the shaft or stem, which bore is larger than the diameter of the stem, there being a novel fastening device having legs or fingers occupying the clearance space between the parts. The legs or fingers of the fastening device cut grooves in the parts during assembly, to prevent relative rotation.

Another object resides in facilitating removal or separation of the parts. Where packed valve stems are employed in valve assemblies, the packing must be slipped over the valve stem. In case fastening means are employed that have a rough exterior surface, such as threads, it is usually necessary to turn down the terminal portion of the stem that is threaded so that the packing will not scrape on the threads as it is pressed over the valve stem proper, this being necessary because the packing usually is somewhat contracted about the stem.

A further object resides in facilitating the mounting of packing on the stem without requiring turning down the handle mounting portion thereof, and, at the same time, providing positive locking to prevent relative rotation of the stem and handle.

The manner in which these and other objects are accomplished will appear in the following detailed description of a preferred embodiment of my invention.

In the drawings:

Fig. 1 represents a blank for the forming of a fastening device made in accordance with the invention;

Fig. 2 shows an end view of the completed fastening device;

Fig. 3 shows a side view thereof;

Fig. 4 fills the transverse section through the assembled valve stem and handle; and Fig. 5 shows longitudinal section through the assembly taken on 5—5 in Fig. 4.

As seen in Fig. 1, the fastening device may be formed from a punched blank of carbon or spring steel. It includes a plurality of fingers forming members 11 connected by annulus means 10. The finger blanks 11 are subsequently bent axially and then twisted about an axis parallel to that of the cylinder in which the finger blanks lie to produce fingers 12a and 12b shown in the remaining figures.

In the preferred form, alternate fingers are twisted oppositely to provide against relative rotation in both directions. With this construction the fingers have diagonally-opposed biting or cutting edges, fingers 12a having outer cutting edges 14a and inner cutting edges 15a, and fingers 12b having outer cutting edges 14b and inner cutting edges 15b.

Figs. 4 and 5 show an embodiment of the invention employed in connection with a valve stem and handle. The stem S may be of uniform cylindrical section, and may be provided with packing P for sealing in the valve body in the conventional manner. Of course, a packing nut N may also be provided as is well known in the art.

The valve handle H has a neck 20 formed with a bore 21 for reception of the valve stem as shown. The end of the shaft or stem may be chamfered as at 30 to facilitate assembly of the parts. In assembling the parts, the fastening device F is first sprung partially over the end of the stem S, this operation being facilitated by chamfer 30. The handle H is then slipped partially over fastener F whereupon the parts are pressed together to the position shown in Figs. 4 and 5. During the pressing operation, the fingers are gradually twisted in a direction opposite to the twist imparted to them during the forming of the fastener F. As this happens the cutting edges 14a and 14b cut into the wall of bore 21 both radially and circumferentially. The same action occurs between the fingers 15a and 15b and the valve stem. This twisting action provides effective abutments for the side walls of the fingers which may have sheared-up small ridges along the stem that augment the holding force. The flattening and twisting of the fingers exerts circumferential pressure on the abutments so that a very tight and shake-proof joint is obtained.

I prefer to dimension the parts so that the radial thickness of the fingers t shown in Fig. 2 is substantially equal to the clearance space between the handle bore 21 and the stem S. Thus, no lateral shake is possible, and since the medial section of the fingers is completely confined, there will be no initial twisting of the fingers when a torque is applied to the handle; rather, force is transmitted to the handle immediately, within the limits of the strength of the materials. In other words, no relative motion between the handle and stem can occur without shearing one or both of those parts and the turning torque cannot further twist the fingers and so permit relative motion. Because of the opposite disposition of the fingers, relative to one another, the device will effectively lock the parts together without possibility of relative motion in response to torques in either direction. Also, there is relatively small crushing force on the fingers, rather, they are in substantially pure shear.

It will be understood that if it is desired to transmit torque in but one direction, the fingers need not be oppositely twisted, but, in so far as the transmission of said torque is concerned, the action will be of that herein described.

The fastening device F is preferably of harder material than either the shaft or the socket member, ordinary spring steel that is hardened and tempered after forming being suitable in most instances. I may add a fastener or screw 22 to prevent axial withdrawal of the handle H in some cases, whereas in others the screw may be omitted. It can be seen that even as small abutments are sheared up by the fingers as they twist during assembly, these are longitudinal and so will not appreciably interfere with the slipping of packing material P over the stem S. Also, the handle H may be readily removed for changing the packing material or for any other reason. When the handle is reapplied after removal, since the fingers will have sprung inwardly when the handle is clear, new grooves will be cut in the stem which will cause a reaction against the formed, old grooves in the handle and produce a tight fit. Even if the handle is replaced so that the fingers slide into the old grooves, there will be no clearance between the fingers and the grooves and a tight joint will be produced as before. Of course, my fastening device may be employed to join a stem or rod to a handle or plate with a through bore in cases where severe axial forces are not encountered.

Having described a preferred embodiment of my invention, it will be understood that various modifications thereof may be made without departing from the mode of operation described, and, accordingly, I contemplate the appended claims and not the aforesaid embodiment be determinative of the scope of my invention.

What is claimed is:

1. A valve stem assembly comprising a cylindrical packing and handle engaging portion of uniform diameter and uninterrupted circumference, a valve handle having a bore a greater diameter than that of said stem portion, and a fastening member for connecting said stem portion and handle together, said fastening member comprising three or more connected axially-extending fingers disposed in the clearance space between said stem and handle, said fingers having cutting edges disposed in shallow grooves in said stem and handle formed by axially pressing said stem, handle, and fastening member together, the radial thickness of said fingers being substantially equal to the clearance space between said stem and handle, the circumferential extent of said fingers exceeding their radial extent.

2. In a rod joint, a rod member, a second member for connection to said rod member having a bore a greater diameter than that of said rod member, and a fastening member for connecting said rod and second member together, said fastening member comprising three or more axially-extending connected fingers disposed in the clearance space between said members, said fingers having cutting edges disposed in three or more grooves in said members formed by axially pressing all said members together, the radial thickness of said fingers being substantially equal to the clearance space between said rod and second members, the circumferential extent of said fingers exceeding their radial extent.

3. In a rod joint, a rod member, a second member for connection to said rod member having a bore a greater diameter than that of said rod member, and a fastening member for connecting said rod and second member together, said fastening member comprising three or more axially-extending connected fingers generally rectangular in cross-section disposed in the clearance space between said members, said fingers being twisted slightly about their axes to form cutting edges, said cutting edges being disposed in shallow grooves in said members formed by axially pressing all said members together, the radial thickness of said fingers being substantially equal to the clearance between said members, at least one of said fingers being twisted oppositely to another of said fingers, the circumferential extent of said fingers exceeding their radial extent.

4. In a rod joint, a rod member, a second member for connection to said rod member having a bore a greater diameter than that of said rod member, and a fastening member for connecting said rod and second member together, said fastening member comprising a plurality of connected axially-extending fingers rectangular in cross-section disposed in the clearance space between said members, said fingers being twisted slightly about their axis to form cutting edges, said cutting edges being disposed in shallow grooves in said members formed by axially pressing all said members together, the radial thickness of said fingers being substantially equal to the clearance space between said rod and second members, the circumferential extent of said fingers exceeding their radial extent.

5. A fastening member for coupling a rod member to a member bored to receive said rod member comprising three or more generally-parallel, axially-extending connected fingers lying substantially in a cylinder, said fingers having a rectangular cross-section and being twisted slightly about an axis generally parallel to the cylinder axis to form diagonally-opposed cutting edges, the circumferential extent of said fingers exceeding their radial extent.

6. A fastening member for coupling a rod member to a member bored to receive said rod member comprising three or more generally-parallel, axially-extending fingers lying substantially in a cylinder, said fingers having a rectangular cross-section and being twisted slightly about an axis generally parallel to the cylinder axis to form diagonally-opposed cutting edges, at least one of said fingers being twisted oppositely to another of said fingers, the circumferential extent of said fingers exceeding their radial extent.

LOUIS B. COURTOT.

REFERENCES CITED

The following references are of record in the file of this patent:

UNITED STATES PATENTS

| Number | Name | Date |
|---|---|---|
| 1,846,271 | Olson | Feb. 23, 1932 |
| 2,131,407 | Murray | Sept. 27, 1938 |
| 2,276,753 | Tinnerman | Mar. 17, 1942 |
| 2,301,169 | Engstrom | Nov. 3, 1942 |